United States Patent [19]

Yamaashi et al.

[11] Patent Number: 5,621,429
[45] Date of Patent: Apr. 15, 1997

[54] VIDEO DATA DISPLAY CONTROLLING METHOD AND VIDEO DATA DISPLAY PROCESSING SYSTEM

[75] Inventors: Kimiya Yamaashi, Hitachi; Masayuki Tani, Katsuta; Koichiro Tanikoshi, Hitachi; Masayasu Futakawa, Hitachi; Masato Horita, Hitachi; Harumi Uchigasaki, Katsuta; Atsuhiko Nishikawa, Mito; Atsuhiko Hirota, Hitachi, all of Japan

[73] Assignee: Hitachi, Ltd., Tokyo, Japan

[21] Appl. No.: 213,203

[22] Filed: Mar. 15, 1994

[30] Foreign Application Priority Data

Mar. 16, 1993 [JP] Japan ................................. 5-055526

[51] Int. Cl.$^6$ ........................................................ G06T 1/00
[52] U.S. Cl. .......................... 345/119; 345/155; 345/113; 345/120; 345/202; 395/128; 395/344; 395/135; 348/384; 348/390; 348/572
[58] Field of Search ................................. 395/128, 158, 395/152, 154, 135, 157, 161; 345/113–114, 119, 120, 132, 155, 202; 369/14–15, 20; 348/97, 384–387, 390, 399, 552, 561, 563–569, 572, 575, 581, 584–586, 588, 596, 598; 382/47, 298–299

[56] References Cited

U.S. PATENT DOCUMENTS

| | | | |
|---|---|---|---|
| 4,783,652 | 11/1988 | Lumelsky | 345/197 |
| 4,931,957 | 6/1990 | Takagi et al. | 395/145 |
| 5,027,110 | 6/1991 | Chang et al. | 345/132 |
| 5,046,001 | 9/1991 | Barker et al. | 395/157 |
| 5,060,170 | 10/1991 | Bourgeois et al. | 395/157 |
| 5,129,055 | 7/1992 | Yamazaki et al. | 395/158 |
| 5,151,974 | 9/1992 | Tani et al. | 395/128 |
| 5,179,639 | 1/1993 | Taaffe | 395/128 |
| 5,230,041 | 7/1993 | Dinwiddie, Jr. et al. | 395/162 |
| 5,237,648 | 8/1993 | Mills et al. | 395/133 |
| 5,239,625 | 8/1993 | Bogart et al. | 395/128 |
| 5,260,783 | 11/1993 | Dixit | 348/415 |
| 5,351,067 | 9/1994 | Lumelsky et al. | 345/191 |
| 5,355,450 | 10/1994 | Garmon et al. | 395/162 |
| 5,384,908 | 1/1995 | Mackinlay | 395/152 |
| 5,388,197 | 2/1995 | Rayner | 395/154 |
| 5,404,316 | 4/1995 | Klingler et al. | 364/514 R |
| 5,412,775 | 5/1995 | Maeda et al. | 395/158 |

FOREIGN PATENT DOCUMENTS

A3-205999 9/1991 Japan.

Primary Examiner—Joseph H. Feild
Attorney, Agent, or Firm—Kenyon & Kenyon

[57] ABSTRACT

A video data display controlling method and system in which an image in each image area or in each partial image area of each image area to be displayed on a display screen and designated by a user is displayed at a display quality differentiated from other areas not designated. A video data display control unit stores display state data of each displayed image in a display state management table. The video data display control unit changes the display specification or attribute of each image so as to display an image having a high user interest degree with a high display quality and display an image having a low user interest with a low display quality, and transfers the changed display specification to a display specification management table of a video data input unit. A video data input unit controls a video data compressing unit to compress digital video data in accordance with the changed display specification or attribute.

7 Claims, 8 Drawing Sheets

106 DISPLAY SPECIFICATION MANAGEMENT TABLE

| NAME OF VIDEO DATA DISPLAY UNIT | SERIAL NUMBER OF INPUT APPARATUS | DISPLAY SPECIFICATION | |
|---|---|---|---|
| DISPLAY 1 | INPUT 1 | DISPLAY ORIGIN | (0, 0) |
| | | IMAGE AREA SIZE | (300, 300) |
| | | NUMBER OF FRAMES | 10 |
| | | NUMBER OF PIXELS | (150, 150) |
| | | NUMBER OF BITS | 8 |
| ⋮ | ⋮ | ⋮ | ⋮ |

FIG. 4A

203a DISPLAY SCREEN

Win-1
Win-2
Win-3

206 DISPLAY STATE MANAGEMENT TABLE

| SERIAL NUMBER OF WINDOW | DISPLAY AREA | OVERLAPPING ORDER | IMPORTANCE FACTOR |
|---|---|---|---|
| Win-1 | 100 | 1 | 70 |
| Win-2 | 30 | 2 | 30 |
| Win-3 | 40 | 3 | 50 |

VIDEO DATA DISPLAY CONTROLLING METHOD AND VIDEO DATA DISPLAY PROCESSING SYSTEM

BACKGROUND OF THE INVENTION

The present invention relates to a video data display control technique. More particularly, the invention relates to a video data display controlling method and a video data display processing system, suitable for systems such as a video data monitoring system using a computer, for displaying a plurality of images on a display screen by changing the display quality of each image or for displaying one image by changing the display quality of an image in a desired partial area.

It is common to display video data supplied from a camera or a VTR on a display screen of a computer system. There are two main systems for displaying video data on a display screen of a computer system. According to one system, supplied video signals are made compatible with computer video signals in an analog level. According to the other system, video signals are sampled and converted into digital video signals and displayed on a display screen of a computer system.

In a communications network interconnecting a plurality of remote computers and transferring data therebetween, it is convenient that video signals can be transferred over the communications network in the same manner as general digital data. The method of converting video signals into digital video signals is therefore becoming a main trend as compared to the method of synthesizing video signals in an analog level.

Real time and data amounts are important considerations when video data is processed in the form of digital data. In a general television, one frame has 525 scan lines in the vertical direction, and a frame rate of 30 frames per second are used. An image in one frame is sampled at 525 ×525 points in the vertical and horizontal directions so that if one pixel is converted into digital data of 8 bits, the image in one frame has a capacity of 525×525 =275625 bytes (about 300 Kbyte). Therefore; at a frame rate of 30 frames per second, a data capacity of 300 Kbyte ×30 frames =9 MB per second is required. Each image in one frame is required to be displayed during one frame period. If one computer processes digital data of a plurality of images, the total data capacity increases further. As a result, the load of display processing on a computer becomes large, and the transmission load on a communications network becomes large if digital video data is transferred via the network to a video data display unit.

As proposed in JP-A-3-205999, the load of display processing on a computer and a transmission load on a communications path, i.e., a system load, has been reduced conventionally in the following manner. In displaying a plurality of images of subjects to be monitored on a single monitor screen, the frequency of displaying each image is changed in accordance with the running condition of the subject, the importance factor of the subject, or the danger degree of the subject, to thereby reduce the amount of data to be processed and transferred and provide efficient monitoring.

The above-described conventional technique does not consider the degree of display quality of each of a plurality of images displayed on a display screen of a computer. The frequency of displaying video data is changed depending upon only the importance factor of a subject, so that there arises a problem that an image a user really desires to observe cannot be displayed finely.

SUMMARY OF THE INVENTION

The present invention provides a digital video data display controlling method and a digital video data display processing system, capable of displaying video data requested by a user efficiently and with a different display quality and reducing a system load.

According to one aspect of the present invention, a video data display controlling method is provided in which basically a user interest degree of an image in each image area or in each partial image area of each image area to be displayed on a display screen is estimated, an image in each image area or an image in each partial image area having a high interest degree is displayed with a high display quality whereas an image in each image area or an image in each partial image area having a low interest degree is displayed with a low display quality. Specifically, in this method, the display quality priority order of images in image areas (or in partial image areas) is determined in accordance with the display state of each image in the image area (or in the partial image area), a preset importance factor, and the like. In accordance with this display quality priority order, the display specification or attribute of each image in the image area (or in the partial image area) is changed. As a result, according to another aspect of the present invention, the amount of digital video data is totally reduced so as to match the system load.

According to another aspect of the present invention, there is provided a system for realizing a video data display controlling method that includes a video data input device; a video data display; and a signal transmission path interconnecting the video data input device and the video data display means.

The video data input device includes:

a video data sampler for sampling inputted analog video data at a predetermined sampling timing and converting the inputted analog video data into digital video data; a display specification management table for storing a display specification of each image transferred from the video data display; a video data compressor for compressing the digital video data in accordance with the display specification; and a video data input controller controlling the video data sampler and the video data compressor.

The video data display includes: a display for displaying each image; a display driver for driving the display; a video data display controller for controlling the display driver means; a display state management table for storing data representing at least the display state of each image displayed on the display; and priority order determine for determining a display quality priority order of images in accordance with the data stored in the display state management table.

The video data display controller controls the display driver means to receive from the video data input device the digital video data of a plurality of images corresponding to a display request command and to display a plurality of images on the display, and operates to store the display state of each image displayed on the display in the display state management table, to change the display specification of each image in accordance with the priority order determined by the priority order determiner, and to transfer the changed display specification to the display specification management table of the video data input unit.

The teaching of the above-described constituent elements of this invention relies upon the following recognition by the inventor. Generally, a user does not monitor all of a plurality of images in image areas displayed on a display screen at the same interest degree. For example, if images are displayed in an overlap manner, a user pays attention to the front image, and other background images are observed by the user only supplementarily. An image frequently displayed has a high interest degree or importance factor, whereas an image less frequently displayed has a low interest degree and can be assumed to be a supplementary image. An image with a high interest degree is displayed with a good display quality having a high resolution, whereas a supplementary image with a low interest degree is not necessary to be displayed always with a good display quality.

From the above recognition, according to the present invention, the display specification of each image is changed in accordance with the display quality priority order of images determined from a difference between image display states. It is possible therefore to reduce the transfer amount of digital video data and the amount of display data to be processed.

The transfer capacity of a communications path such as a communications network and the display processing performance of a computer can be efficiently used if the display specification defining the frame rate, the number of pixels in each image area, and the data depth (number of bits) per pixel, respectively of each image area is changed so as to match the transfer capacity and the display processing performance.

The priority order of images can be determined by correlating it to the display area of each image, to the overlapped display area of each image, to a total display time of each image, to an importance factor preset to each image, and to a combination of these parameters.

The display specification may be automatically changed or may be changed by a user by inputting a change instruction.

Other objects and advantages of the invention will become apparent from the following detailed description when read in conjunction with the accompanying drawings.

DETAILED DESCRIPTION

Figure 1:
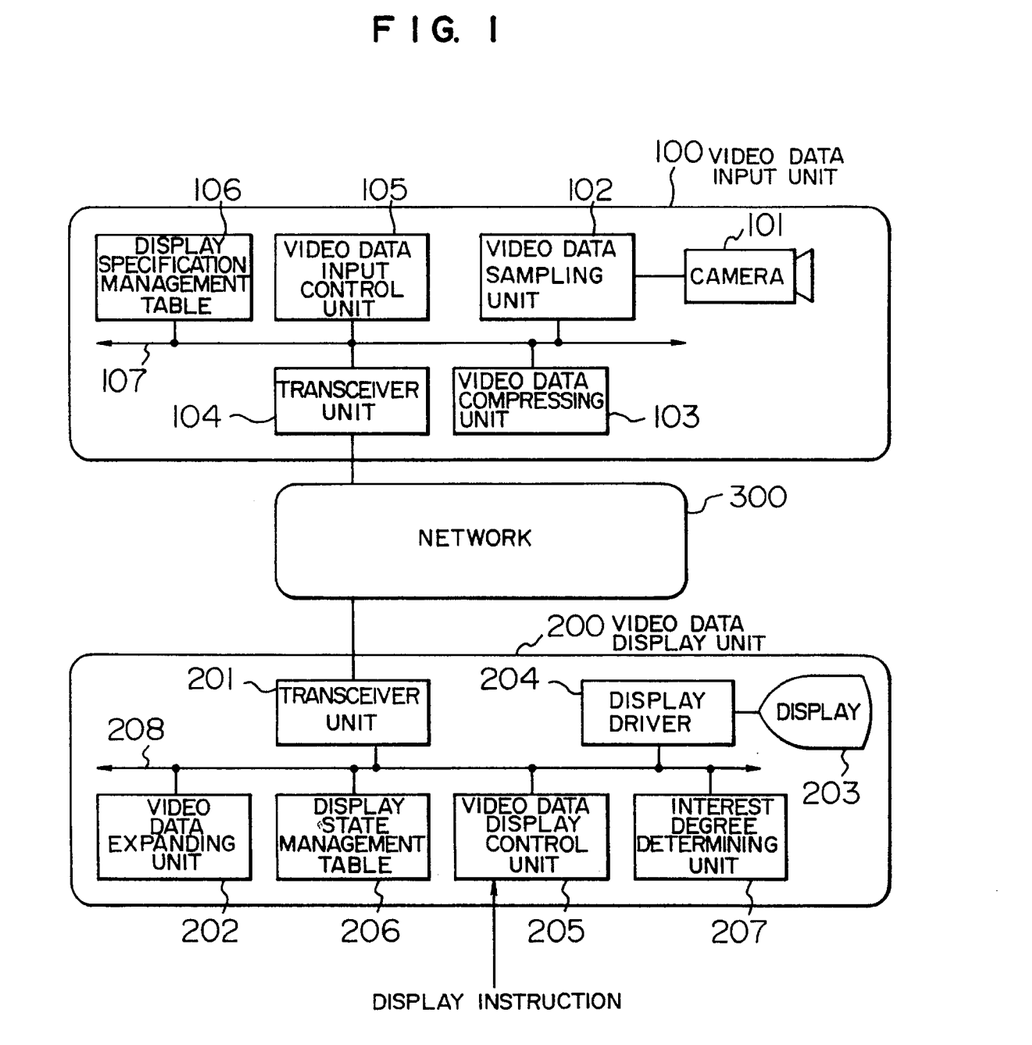
FIG. 1 is a schematic block diagram showing the overall structure of a video data processing system according to a first embodiment of the present invention.

A first embodiment of the present invention will be described with reference to FIGS. 1 to 6. As shown in FIG. 1, a video data processing system has three main units including a video data input unit 100 for inputting video data to the system, a video data display unit 200 for displaying video data of text, graphics, or both, and a communications network 300 for interconnecting the video data input unit 100 and video data display unit 200 and transferring various data including video data and control data.

The video data input unit 100 includes a camera 101 for taking an image and inputting analog video data representing the image, a video data sampling unit 102, a video data compressing unit 103, a transceiver unit 104, a video data input control unit 105, a display specification management table 106, and a bus 107. The video data sampling unit 102 converts analog digital data inputted from the camera 101 into digital video data. The video data compressing unit 103 compresses digital video data and reduces its capacity. The transceiver unit 104 transmits various data including compressed digital video data to the video data display unit 200 via the communications network 300 and receives data from the video data display unit 200 via the communications network 300. The video data input control unit 105 controls the operation of the video data input unit 100. The display specification management table stores attribute data of each image area (each picture area or each window opened to the display screen). Video data of an image in each image area is transmitted to the video data display unit 200. The attribute data includes an image area position, an image area size, the number of frames per unit time, the number of pixels, a pixel data length, and the like. The bus 107 interconnects these units and table of the video data input unit 100.

The video data display unit 200 includes a transceiver unit 201, a video data expanding unit 202, a display driver unit 204 for driving a display 203 and displaying video data on the screen, a video data display control unit 205, a display state management table 206, an interest degree determining unit 207, and a bus 208. The transceiver unit 201 receives data from the video data input unit 100 via the communications network 300 and transmits data to the data input unit 100 via the communications network 300. The video data expanding unit 202 expands compressed digital video data inputted from the video data input unit. The video data display control unit 205 controls the display driver unit 204 in accordance with information of display images designated by an operator display instruction and information of a command representing a display state, thereby displaying the designated images on the display at the requested display state. The display state management table 206 stores display state data and preset image area importance factors of image areas displayed on the display 203. The display state data includes the size of each image area, the order of overlapping image areas, and the like. The interest degree determining unit 207 determines a user interest degree of each image area in accordance with the display state data and preset image area superiority rank data. The bus 208 interconnects these units and table of the video data display unit 200. The user interest degree signifies the order of image areas in which order a user is assumed to see the images displayed on the screen in respective image areas. The quality of each displayed image is controlled in accordance with this order. Therefore, the user interest degree corresponds to the priority order of qualities of images displayed in image areas. The video data display control unit 205 manages the display state of each image area, stores preset display state data to be described later in the display state management table 206, determines the display specification of each image in accordance with the interest degree determined by the interest degree determining unit 207, and transfers the display specification to the video input unit 100 to change the contents of the display specification management table 106.

In the video data processing system shown in FIG. 1, a single set of the video data input unit 100 and the video data display unit 200 is shown. However, this system may have a plurality of video data input units 100 and video data display units 200. In this case, a single image may be displayed on a plurality of video data display units 200 or images from a plurality of video data input units 100 may be displayed at one video data display unit 200.

The details of the structure of each unit and table will be explained.

Figure 2:
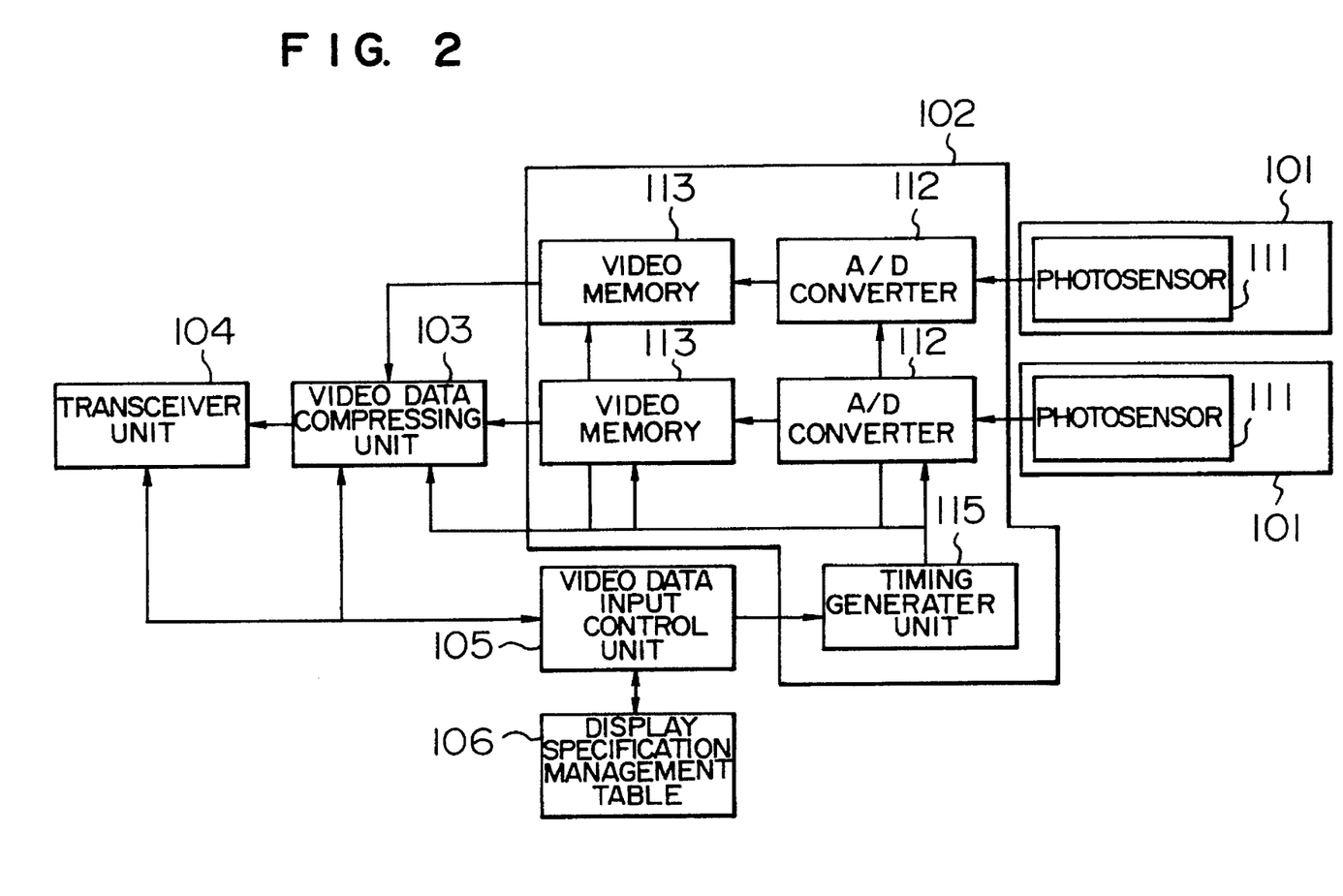
FIG. 2 is a block diagram showing the detailed structure of the video data input unit of the first embodiment.

FIG. 2 shows the detailed structure of the video data input unit 100. The video data input unit 100 is provided with a plurality of cameras 101 (in this example, two cameras). Each camera 101 has a photosensor 111 for converting a light intensity of a subject into electric signals. For the simplicity of description, the effective number of pixels of each photosensor is assumed to be about 500×500 pixels for a monochromatic image. A video signal may be inputted directly to the video data input unit, without using the camera 101.

Video data outputted from the camera 101 is analog signals. In order to process these analog signals by a computer system, they are first converted into digital signals by an A/D converter 112 of the video data sampling unit 102. The number of bits used for the A/D conversion is assumed to be 8 bits per pixel. The A/D conversion is performed synchronously with timing signals outputted from a timing generator unit 115. The converted digital video data outputted from the A/D converter 112 is stored in a video memory 113 synchronously with timing signals outputted from the timing generator unit 115.

The timing generator unit 115 generates timing signals for synchronizing the operation of the A/D converter 112 which converts analog video data from the photosensor 111 into digital video data, and also generates timing signals for synchronizing the operation of storing converted digital video data in the video memory 113. In this embodiment, these timing signals are generated so as to sample analog digital data and convert it into digital video data having 8 bits per pixel, and so as to satisfy the conditions that the maximum number of frames per second is 30 frames and the number of pixels of each photosensor is 500×500 pixels.

Each image converted into digital data has a large amount of data. From this reason, in this embodiment digital video data is compressed by the video data compressing unit 103 before it is transmitted to the communications network 300. As a digital video data compressing method, there is known a moving picture compressing method by MPEG (Moving Picture Coding Experts Group). By using this method, moving pictures or images are compressed with respect to their line density and pixel density, and still images having no difference between two consecutive frames are compressed. A compression factor obtainable by a method by MPEG is generally 10 to 100. Therefore, compressed digital video data is several megabits (Mb) at a maximum. The transceiver unit 104 transmits compressed digital data to a designated one of video data display units 200.

In accordance with the display specifications set to the display specification management table 106, the video data input control unit 105 instructs the video compressing unit 103 which digital video data is to be compressed at what timing, and instructs the transceiver 104 to transmit the compressed digital video data to a predetermined video display unit 200.

Figure 3:
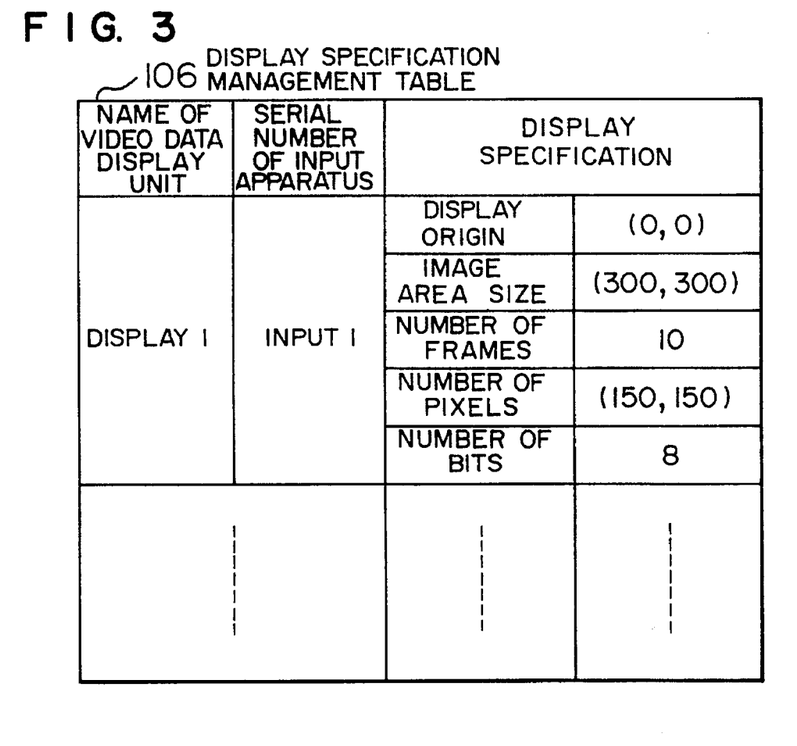
FIG. 3 is a diagram showing an example of the display specification management table.

The display specification management table 106 stores data such as shown in FIG. 3. Specifically, the display specification management table 106 stores the name of each video data display unit 200 to which an image is transmitted, the serial number of each input apparatus or inputting video data of an image, and a display specification of each image to be transmitted to a video data display unit 200. The example shown in FIG. 3 indicates that an image taken by a camera 101 identified by "Input 1" is transmitted to a video data display unit 200 identified by "Display 1". The example of a display specification (attribute data) of an image area to be transmitted shown in FIG. 3 indicates that:

the display origin of input video data to be transmitted and displayed at the video data display unit 200, corresponding to the lower left corner of the image area of the input video data to be transmitted and displayed, is (0, 0) in the horizontal and vertical directions;

the image area size corresponds to (300, 300) dots of the input video data to be transmitted and displayed at the video data display unit 200, in the horizontal and vertical directions;

the number of frames per second of an image to be displayed at the video data display unit 200 is 10 frames; and the number of pixels of an image to be display at the video data display unit is (150, 150) in the horizontal and vertical directions, i.e., a resolution is ½.

The contents of the display specification management table 106 are set in accordance with display specification setting data sent from the video data display unit 200, and are supervised by the video data input control unit 105 independently for each video data display unit 200. That is to say, the display specification setting data is generated by the video data display control unit 205 of the video data display unit 200 as will be later detailed, and transmitted to the transceiver 104 of the video data input unit 100 in the form of a display specification setting command.

In accordance with a display specification setting command received by the transceiver 104, the video data input control unit 105 sets a display specification of each image area to the display specification management table 106.

The format of a display specification setting command is as follows:

"begin": a start of a command train;

"setDisplay": setting a name of a video data display unit 200;

"setInput": setting a serial number of an input apparatus of the video data input unit 100;

"setOrigin": setting a display origin of input video data to be transmitted and displayed at the video data display unit 200;

"setArea": setting an image area size of the input video data to be transmitted and displayed at the video data display unit 200;

"setSamplingTime": setting the number of frames per second of an image to be displayed at the video data display unit 200;

"setResolution": setting the number of pixels of an image to be displayed at the video data display unit 200;

"setBit": setting a data length (the number of bits) of a pixel; and

"end": an end of a command train.

In this embodiment, a network like Ethernet or a network complying with IEEE 802.3 may be used as the communications network 300. Ethernet has a maximum data transfer rate of 10 Mb/sec. As described previously, one image of compressed digital video data to be transmitted from the video data input unit 100 has a capacity of several Mb/sec. Therefore, if one Ethernet cable is used, only several images can be transmitted in one second. As a result, the number of images to be transmitted in one second is limited, or the transfer state of each image is required to be controlled.

A plurality of images displayed on one display 203 may be overlapped or may each have a different display image area without any overlap. It can be hypothesized that a user does not look at a plurality of overlapped images uniformly but rather looks the front image. It can also be hypothesized that a user pays much attention to an image having a larger display image area and pays less attention to an image having a smaller display image area.

The present invention has relied upon the fact that a user interest degree of each image can be estimated from an image display state. In this embodiment, if the transfer capacity of the communications network 300 is lower than a transfer capacity required for inputting, transmitting, and displaying a plurality of images, the display quality of an image, i.e, the display specification of an image, is changed in accordance with a user interest degree. An image with a high user interest degree is displayed finely, whereas an image with a low user interest degree is displayed roughly by degrading a resolution, the number of frames per second, or other parameters. The transfer of digital video data is controlled in accordance with a changed display specification, thereby reducing the transfer load of the communications network 300.

Figure 4A:
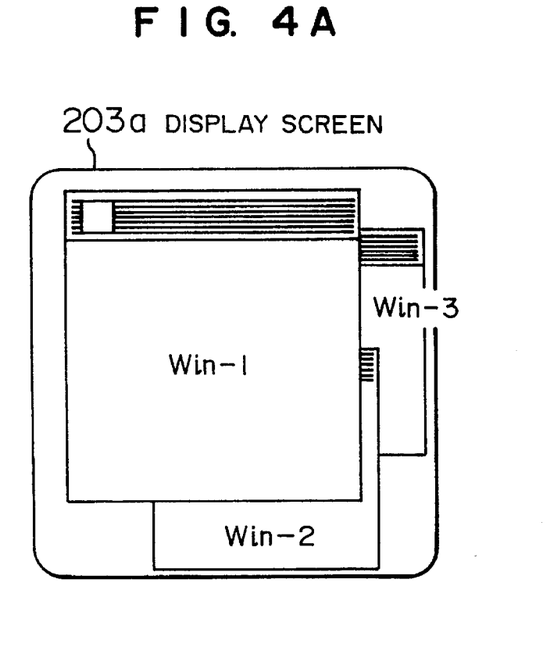
FIG. 4A is a diagram showing an example of a plurality of image areas opened on the display screen.
Figure 5:
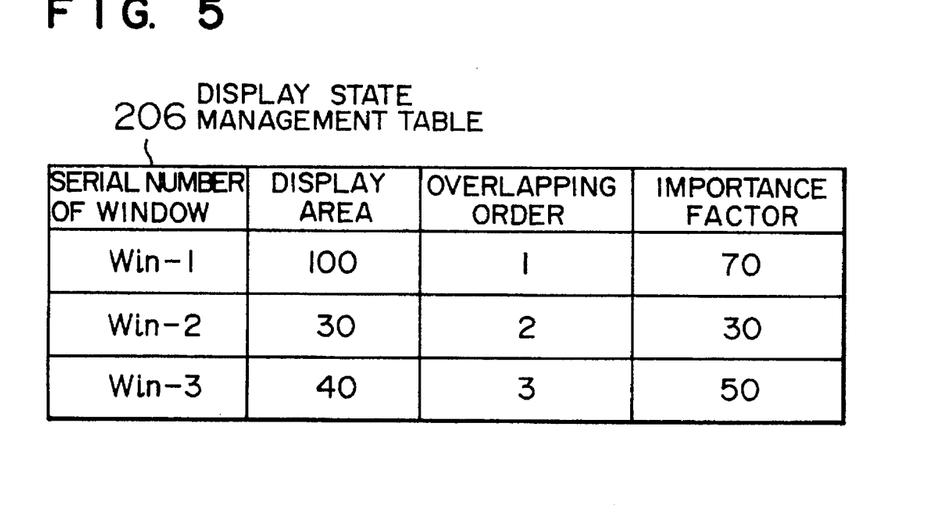
FIG. 5 is a diagram showing an example of the display state management table.

The detailed structure of the main part of the video data display unit 200 will be described, the video data display unit 200 controlling to change the display specification of each image area in accordance with a user interest degree. Display state data of image areas (windows) Win-1 to Win-3 shown in FIG. 4 is stored in the display state management table 206 as shown in FIG. 5. The contents of the display state management table 206 are updated by the video data display control unit 205 each time the display states of the image areas Win 1 to Win-3 opened to a display screen 203*a* are changed. As illustratively shown in FIG. 5, the display state management table 206 stores a display image area (corresponding to the number of dots on the screen), the order of overlapped images (1, 2, 3 from the front image area), and an image area system importance factor (%), respectively for each image area. The importance factor changes with the running conditions of a system, and is stored in advance in the system. For example, in the case of a plant monitoring system, a combination of image areas to be displayed and monitored on a display screen, as well as how each image area is displayed, is preset in advance for each running stage of the system. The user interest degree is therefore determined by considering both the image area importance or materiality preset in the system and the current display state.

The interest degree determining unit 207 evaluates a user interest degree, i.e., the priority order of displaying images at a high display quality, by using the display state data and importance factor set in the display state management table 206. In this embodiment, a user interest degree evaluating method uses the following evaluation equation by way of example.

User interest degree=display image area×(100/overlapping-order)× importance factor The user interest degree is proportional to the display image area and importance factor, and inversely proportional to the overlapping order. The user interest degree of each window having the display state shown in FIG. 4 can be expressed therefore as:

User interest degree for image area Win-1=100×(100/1)×0.7=7000

User interest degree for image area Win-2=30×(100/2)×0.3=500

User interest degree for image area Win-3=40×(100/3)×0.5=500

The video data display control unit 205 determines the display specification of each image based upon the interest degree (priority order) determined by the interest degree determining unit 207. While taking into consideration that the transfer capacity of the communications network 300 of the video data processing system of this embodiment is 10 Mb/sec, a usable transfer capacity of the communications network 300 by each video data display unit 200 is first determined. This usable transfer capacity can be changed when the total running conditions of the system change.

It is assumed here that the usable transfer capacity allocated to each video data display control unit 200 is 2 Mb/sec. The video data display control unit 205 distributes this 2 Mb/sec usable transfer capacity to respective image areas in proportion to the user interests. First, the (total) interest degree of all images displayed at the same time is first calculated. In the example shown in FIG. 5, the total interest degree is 8167. The image area Win-1 is assigned a usable transfer capacity in proportion to a ratio of its interest degree to the total interest degree, i.e., a usable transfer capacity of 2M×7000/8167=1.7 Mb/sec is assigned. The usable transfer capacity N can be expressed by:

N=r×r×t×p/c where $\underline{c}$ is a compression factor of video data of an image in the image area Win-1 to be sent from the video data input unit 100, r×r represents the number of pixels of an image to be displayed, $\underline{t}$ represent the number of frames per second, and $\underline{p}$ represents the number of bits per pixel.

In this embodiment, a compression method by MPEG is used which has a compression ratio of 10 to 100. It is assumed that a compression ratio $\underline{c}$ is 20. The video data display control unit 205 is required to calculate the parameters of the display specification including the pixel number r×r, frame number , and bit number $\underline{p}$ of one pixel data length, by using the assigned usable transfer capacity N. However, the above equation has many unknown parameters. In view of this, it is preferable to assume the values of several parameters and change a parameter most effective in reducing the data transfer amount in accordance with the usable transfer capacity N. Therefore, for example, the bit number of one pixel data length is assumed to $\underline{p}$=8 and the frame number $\underline{t}$ is defined to have a value of 30/overlapping-order.

With such assumption, the number $\underline{r}$ of pixels for Win-1 becomes 377 because it has a usable transfer capacity N of 1.7 Mb/sec, the number $\underline{t}$ of frames of 30/overlapping-order "1"=30, and one pixel data length $\underline{p}$ of 8 bits. The video data display control unit 205 sends the corresponding display specification setting command to the video data input unit 100 from which the video data of the image area Win-1 has been supplied, to thereby set the display specification for the image area Win-1 to the display specification management table 106.

Similarly, the usable transfer capacity N for the image area Win-2 is 2×500/8167=0.12 Mb/sec and the overlapping order is "2". Therefore, the number $t$ of frames is 30/2=15 and the number $r$ of pixels becomes 30, with the one pixel data length $p$ of 8 bits. The video data display control unit 205 sets the corresponding display specification to the display specification management table 106 of the video data input unit 100 from which the video data of the image area Win-2 has been supplied.

Similarly, the usable transfer capacity N for the image area Win-3 is 2×667/8167=0.16 Mb/sec and the overlapping order is "3". Therefore, the number $t$ of frames is 30/3=10 and the number $r$ of pixels becomes 46, with the one pixel data length $p$ of 8 bits. The video data display control unit 205 sets the corresponding display specification to the display specification management table 106 of the video data input unit 100 from which the video data of the image area Win-3 has been supplied.

In the operation of setting a display specification of each window to the display specification management table 106, the video data display control unit 205 generates a display specification setting command and instructs the transceiver unit 201 of the video data display unit 200 to send the command to the video data input unit 100. The transceiver unit 201 transmits the command via the communications network 300 to the transceiver unit 104 of the video data input unit 100. When the setting command is received by the transceiver unit 104, the video data input control unit 105 analyzes this command and changes the contents of the display specification management table 106 of the video data input unit 100. During the operation of receiving analog video data of a subject image from an input apparatus designated by the contents of the display specification management table 106 and transmitting corresponding digital video data to the video data display unit 200 designated by the table 106, the video data input control unit 105 instructs, as described previously, the video compressing unit 103 which digital video data is to be compressed at what timing, while referring to the display specification management table. In this manner, the digital video data compressed so as to match the display specifications can be transmitted to the video data display unit 200.

As described above, according to this embodiment, the display specification of each image of a plurality of images transmitted via a communications path to video data display units is dynamically changed in accordance with a user interest degree of each image area so as to make the total capacity of digital video data to be transmitted match the transfer capacity of the communications path. Accordingly, an efficient video data transmission and display can be performed even if a communications path having a limited transfer capacity is used.

Figure 6:
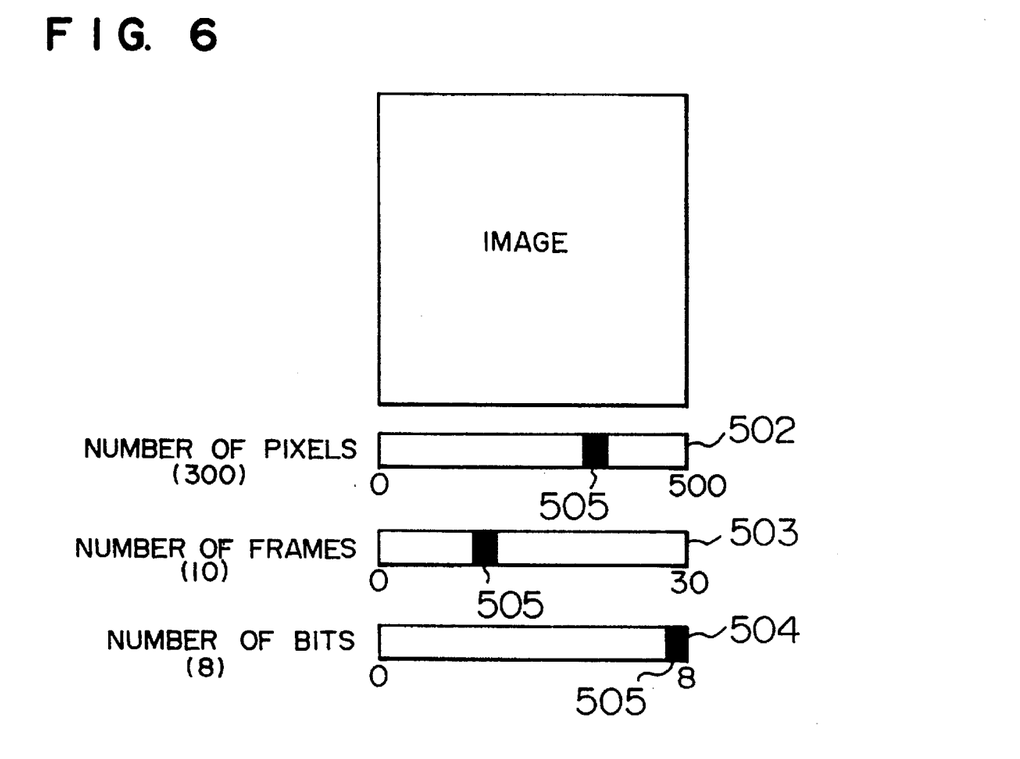
FIG. 6 is a schematic diagram explaining how a user can change a display specification.

In the above-described first embodiment, the display specification of each image area is automatically set in accordance with a user interest degree. The automatically set display specification may be changed by a user. In this case, a user selects an image area whose display specification is desired to be changed, by pointing it with a mouse or the like. In response to a user select, the video data display controller 205 displays, for example, a pixel number change scaler 502, a frame number change scaler 503, and a pixel bit number change scaler 504, as shown in FIG. 6. Each scaler has a cursor 505. A user moves this cursor 505 to a desired value by operating a cursor control unit (not shown). The video data display control unit 205 transmits a display specification set by the user to the video data input unit 100 to change the contents of the display specification management table 106 in the manner described above. In this manner, a user can change an image area on the display screen 203a so as to have the display specification having the pixel number, frame number, and pixel data length set by the user on the change scalers 502, 503, and 504. In this manner, a user can display an image having a desired display specification by operating the cursors of the change scalers 502, 503, and 504, while visually confirming the display specification from the displayed image.

Figure 7:
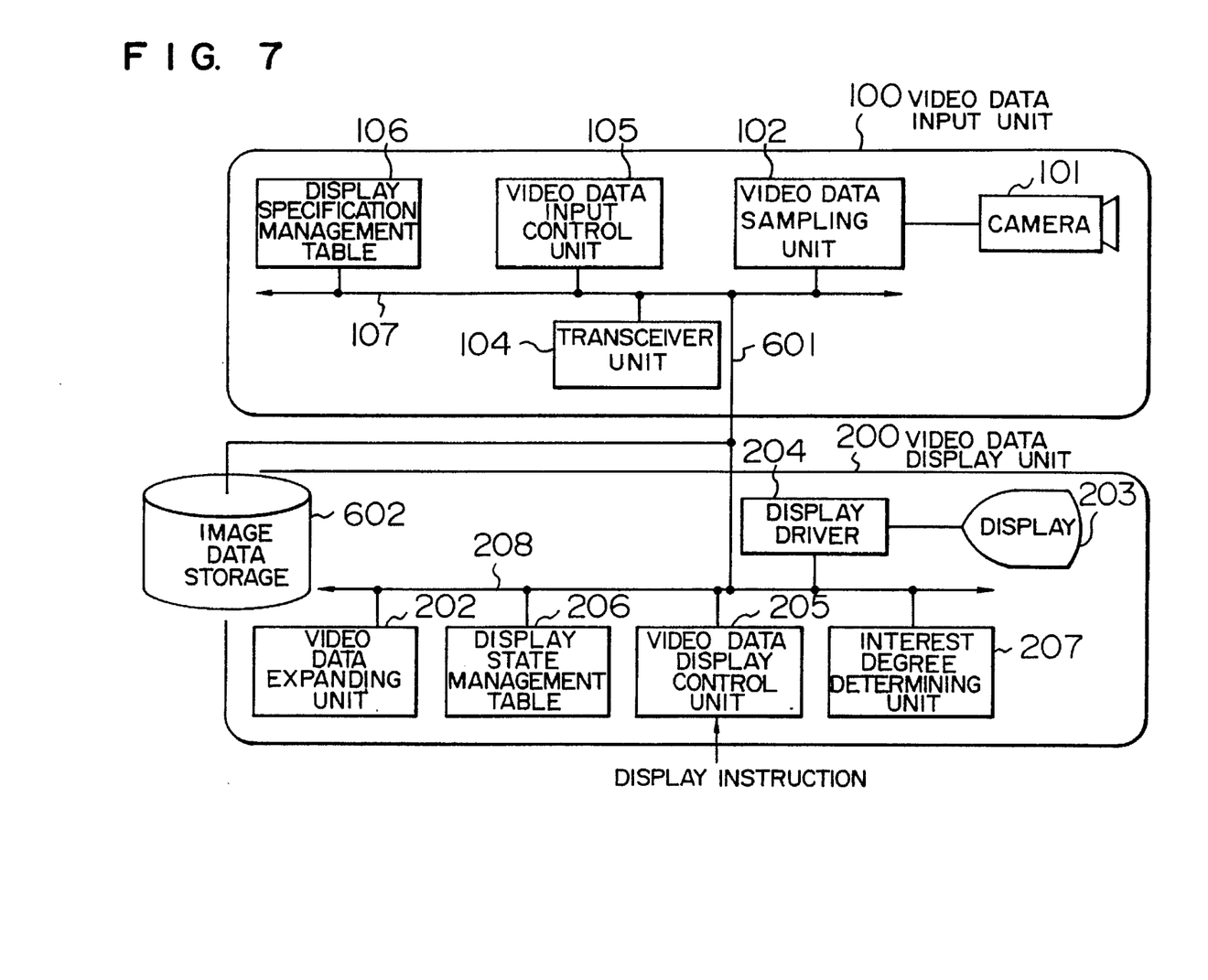
FIG. 7 is a schematic block diagram showing the overall structure of a video data processing system according to a second embodiment of the present invention.

FIG. 7 is a schematic block diagram showing the overall structure of a video data processing system according to the second embodiment of the present invention. In the first embodiment, the video data display unit 200 and video data input unit 100 are located remotely and connected by the communications network 300 and the transfer amount of digital video data is reduced by changing the display specification of each image area in accordance with the transfer capacity of the communications network 300. In the second embodiment, the video data input unit 100 and video data display control unit 205 operate on the same computer system.

The different points of the second embodiment from the first embodiment are a replacement of the communications network 300 by a bus 601 and a newly added video data storage 602 for storing digital video data of input images. The processing performance of one computer also becomes a bottleneck in displaying a plurality of images on a display 203 at the same time. In displaying a plurality of images, one video data display unit 200 is required to process images sent from a plurality of video data input units 100. Therefore, the load of the video data display control unit 205 increases as the number of input images increases. Similar to the first embodiment, the load of the video data display control unit 205 is reduced by changing the display specification of each image area in accordance with a user interest degree (priority order) of images. Although the operation of the second embodiment is fundamentally the same as the first embodiment, a bus 601 is used in place of the communications network 300 for transferring digital video data and display specification setting commands. Therefore, the transceiver units 104 and 201 are not used, but the video data input unit 100 and video data display unit 200 are directly accessed each other by using the bus 601.

In the second embodiment, one of two methods can be used in storing digital video data and changing a display specification. According to the first method, when images inputted from the cameral 101 are sampled at the timing generator unit 115 of the video data input unit 100, the display specification in the display specification management table 106 is referenced and only the image requested by the video data display unit 200 is compressed and stored in the video data storage 602. The video data display control unit 205 reads the stored digital video data and displays it via the display driver unit 204 on the display 203.

With the first method, compressed digital video data of only a necessary image is stored in the video data storage 602, thus reducing the memory capacity. With the first method however, the image whose display specification once changed to a degraded specification such as a low resolution and stored in the video data storage 602 may provide a poor display quality of the image if it is again read and displayed at a later time.

According to the second method, the video data input unit 100 inputs images at a predetermined optimum display specification (usually, the best display specification), and the video data compressing unit 104 compresses the input images and stores compressed digital video data in the video data storage 602. At the video data display unit 200, the video data expanding unit 202 expands digital video data read from the video data storage 602, and the video data display control unit 205 changes the display specification by referring to the display specification management table 106 and displays the image with the changed display specification. With the second method, although the memory capacity of the video data storage 602 increases, the image once selected stored in the video data storage 602 with the optimum display specification provides a good display quality of the image if it is again read and displayed at a later time.

Even if the communications network 300 is not used, the display quality of all images to be displayed at the same time with the same display specification may become poor depending upon the processing performance of the video data display control unit 205. According to the second embodiment, the display specification of each image area is dynamically changed in accordance with a user interest degree, thus allowing an image with a high user interest degree to be displayed with a high display quality.

Figure 8:
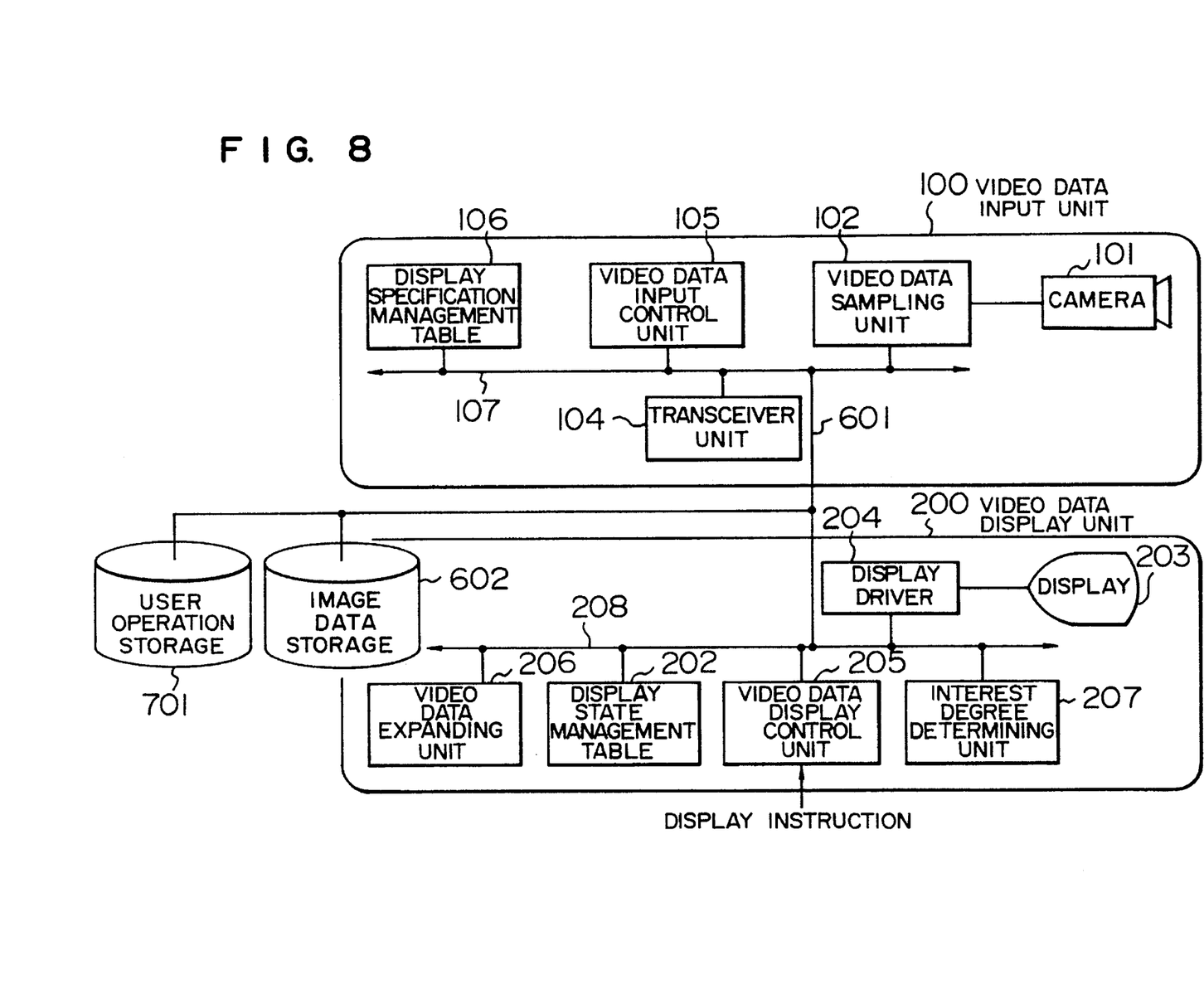
FIG. 8 is a schematic block diagram showing the overall structure of a video data processing system according to a third embodiment of the present invention.

FIG. 8 is a schematic block diagram showing the overall structure of a video data processing system according to the third embodiment of the present invention. In this embodiment, a user interest degree of an image area is modified in accordance with the total time a user observed an image in the image area in the past. In addition to the elements of the second embodiment, this third embodiment system has a user operation storage 701 for storing user operation history data.

The video data display control unit 205 operates to store display time data in the user operation storage 701 at the position corresponding to the input apparatus number identifying a particular camera 101 and stored in the table shown in FIG. 3. This display time data indicates the time period a user observed an image inputted from the input apparatus. The interest degree determining unit 207 determines a user interest degree by referring to the display time data stored in the user operation storage 701. An image frequently observed in the past is given a high interest degree, whereas an image not so often observed in the past is given a low interest degree. Specifically, each time period while a user observed an image inputted from each input apparatus is counted starting from the system start-up, and the total time of respective time periods is stored in the user operation storage 701. The interest degree is modified in proportion to the total time. For example, the interest degree is evaluated by the following equation:

User interest degree=display area×(100/overlapping-degree)×importance factor×time ratio For example, assuming that the ratio of times a user observed image areas in Win-1, Win-2, and Win-3 is 50:30:20, the interest degrees of the image areas are given by:

Interest degree for Win-1=100×(100/1)×0.7×0.5=3500

Interest degree for Win-2=30×(100/2)×0.3×0.3=150

Interest degree for Win-3=40×(100/3)×0.5×0.2=133

In the above embodiments, the user interest degree has been determined based on a display area and/or an window overlapping order. The state of displayed windows has other different attributes or parameters. For example, a display ratio and a distance between windows as illustrated in FIG. 4B may be used instead of the display area.

The display ratio is a ratio of a displayed area of a window to the whole area of the window. For example, if a half area of a window is covered by another window, the display ratio is 0.5. A user interest degree is set larger the larger the display ratio.

Figure 4B:
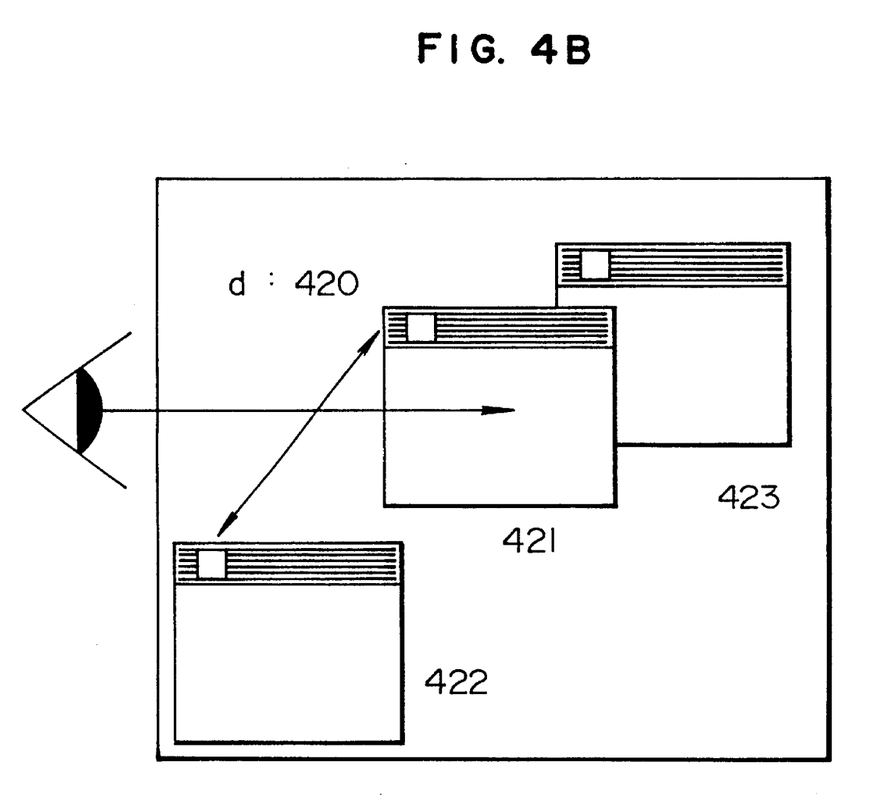
FIG. 4B is a diagram showing another example of a plurality of image areas opened on the display screen.

As shown in FIG. 4B, the distance between windows is a distance $\underline{d}$ 420 from a window 421 a user attends to another window. A user interest degree is set larger the longer the distance. The window 421 a user attends is designated explicitly by a user by inputting a display instruction, for example, by selecting the window by using a mouse.

In the first to third embodiments, the display conditions of a plurality of images (different pictures) are changed in accordance with a user interest or attention degree.

The fourth embodiment will be described with reference to FIG. 9. In this embodiment, each image area is constituted by areas having a high interest degree and areas having a low interest degree, and the data transfer and display scheme is changed for each area. That is to say, in order to transfer an image having a large data capacity under a limited network communications capacity, a user interactively designates an area having a high interest degree (hereinafter called interest area) and an area having a low interest degree (hereinafter called background area), and the interest area is displayed at a high resolution, whereas the background area is displayed at a low resolution. As a result, the interest area can be displayed finely even under a small and limited transmission capacity. In this embodiment, a resolution is changed by thinning pixels of an image.

A user manipulates a mouse (input device) for entering a display instruction to the video data display control unit 205 of the video data display unit 200 while observing an image sent from the communications network, to thereby set a parameter (interest degree) for designating an interest area and its resolution.

The interest degree indicates a ratio of the number of pixels of an image to be actually displayed to the number of pixels of an image to be sampled at the video data input unit 100, this ratio determining the number of pixels of an image in an interest area to be sampled. For example, if video data of an image in the interest area having an interest degree of ½ is transferred from the video data input unit 100 to the video data display unit 200, pixels are thinned by ½ during the sampling operation to make the number of pixels to be transferred have a half of the number of pixels to be actually displayed. When this thinned video data transferred to the video data display unit 200 is displayed, the video data is enlarged by twice (multiplied by an inverse of the interest degree).

From the viewpoint of the total video data amount, the number of pixels (resolution) of an image in an interest area can be increased by lowering the resolution of an image in the background area (by thinning the number of pixels of an image in the background area). In other words, the number of pixels of an image in the background area is changed by the video data display control unit 205 by always maintaining constant the sum of video data amounts of images in the interest and background areas, i.e., by always maintaining constant the amount of video data transferred over the network. For example, if an image of a half size (320×240 pixels) and a full color (RGB 24 bits) has a data amount of 230.4 Kbyte per one frame. If this image is transferred under a transmission capacity of 57.6 Kbyte, a resolution of the image is required to be lowered by ¼ over the whole area of the image. As a result, even an image in the interest area is displayed at a low resolution. According to the transfer and display scheme of this embodiment, however, if for example a user designates an interest area having 100×100 pixels at an interest degree of 1, the pixels of an image in the background area is thinned from 66800 pixels (=320×240 −100×100) to 9200 pixels (57.6 Kbyte=460800 bits: 460800/24=19200 pixels per one frame: background area (19200−10000) pixels) to lower the resolution by 1/7. As a result, an image in the interest area can be displayed finely even under a small transmission capacity of 57.6 Kbyte.

Figure 9:
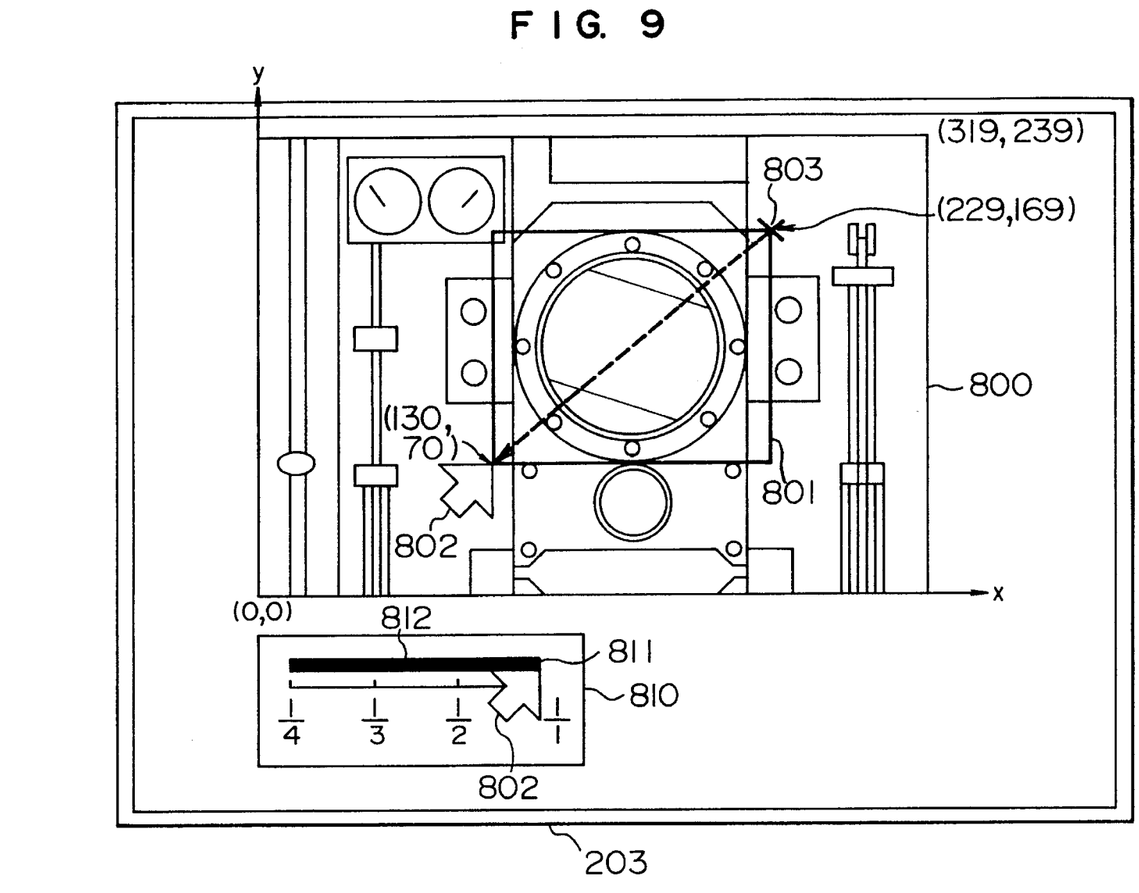
FIG. 9 is a diagram explaining a video data processing method and system according to a fourth embodiment of the present invention.

Referring to FIG. 9, how an interest area is designated will be explained by taking an interest area 801 by way of example. While observing a window 800 opened on the display 203, a user designates an interest area as a rectangle by using a mouse. One corner 803 of the interest area 801 is first designated. To designate this corner 803, a cursor 802 is moved to the corner 803 and the left button of the mouse is depressed. Then the cursor 802 is moved while the left button is depressed at the same time, to thus draw a rectangle 801. This rectangle 801 corresponds to the interest area whose opposite corner is determined when the left button of the mouse is released. In this manner, the interest area 801 is determined.

The window 800 has a coordinate system in which the lower left corner is an origin (0,0), and the right side of the x-axis and the upper side of the y-axis are positive. One scale of this coordinate system corresponds to one pixel. The size of the window 800 is defined by horizontal 320 pixels and vertical 240 pixels so that the maximum value in the x-axis is 319 and the maximum value in the y-axis is 239. The coordinates of the interest area are represented by the coordinates of the lower left corner and the upper right corner of the interest area. Therefore, the coordinates of the interest area 801 are represented by (130, 70)–(229, After the interest area 801 is determined, the user designates the interest degree using a window 810. This window 810 is displayed after the interest area 801 was determined, and has an interest degree setter 811. The user operates upon the interest degree setter 811 using the mouse. The right end of a black bar 812 of the interest degree setter 811 indicates an interest degree. In this example, the interest degree displayed in the window 810 is 1/1.

The black bar 812 of the interest degree setter 811 in the window 810 moves right and left as the cursor 802 is moved right and left by the mouse while depressing the left button thereof. If the user releases the left button when the scale of the interest degree setter 811 indicates a desired interest degree, the interest degree can be set to that value.

If the designated interest area is to be cancelled, the cursor 802 is moved to the inside of the interest area and the right button of the mouse is clicked once. If there is no interest area to be further designated other than the designated interest area 801, the center button of the mouse is clicked once.

Information of the interest area coordinates, interest degree, and the number of pixels of the background area is managed by storing it in the display state management table 206. The information stored in the display state management table 206 is transmitted to the video data input unit 100 to change the contents (interest area coordinates, interest degree, and the number of pixels of the background area) of the display specification management table 106. The video data sampling unit 102 thins the pixels of the image in accordance with the display specification, and the thinned video data is compressed by the video data compressing unit 103, and transmitted via the communications network 300 to the video data display unit 200. At the video data display unit 200, the video data expanding unit 202 expands the received video data, and the display driver 204 enlarges the expanded video data to have the number of pixels of an image to be displayed on the window, in accordance with the information (the interest area coordinates, interest degree, and the number of pixels of the background area) stored in the display state management table 106, synthesizes the enlarged images in the interest area and background area, and displays the synthesized image on the display 203.

In this embodiment, means for designating an interest area placed at the video data display unit 200 has been described. This means may be placed at the video data input unit 100. The embodiment system is applicable to a videophone system, video conference system, plant monitoring system, traffic control system, and other systems.

According to this embodiment, a resolution is lowered not at the whole area of an image but at the area other than the area a user desires to observe. Therefore, the image in the area a user desires to observe can be displayed finely. Although the interest area of a rectangular shape has been described, the shape of the interest area is not limited only to the rectangle, but any other shapes may be used such as a polygon, a circle, mask patterns used for image recognition, and the like.

By using the above-described transfer and display scheme, an image in the interest area a user desires to observe can be displayed finely even if video data is transferred under a limited transmission capacity.

As described so far, the invention has the following advantageous effects.

The display specification of each image area is changed in accordance with the display quality priority order of image areas determined from a difference between image area display states, thereby reducing the transfer amount of digital video data or the amount of display data to be processed.

The transfer capacity of a communications path such as a communications network and the display processing performance of a computer can be efficiently used if the display specification (.the frame rate, the number of pixels in each image area, the data length (number of bits) per pixel) of each image area is changed so as to match the transfer capacity and the display processing performance.

What is claimed is:

1. A video data display controlling method comprising the steps of:

(a) designating a partial image area of an image displayed on a display screen;

(b) in response to a designation of said partial image area, differentiating the display quality of said image between said designated partial image area and another partial image area on the display screen, said differentiating including differentiating a resolution of said image; and (c) changing the display state of said image in accordance with the results of said designating step and said differentiating step and wherein said differentiating step includes setting a window display priority order in accordance with resolutions of images at said designated partial image area and image areas.

2. A video data display controlling method wherein analog video data is converted into digital video data, and a plurality of images corresponding to a display request command area displayed on a single display screen by using said converted digital video data, said method comprising the steps of:

obtaining display state data of said images displayed on said display screen;

determining as a display order a display quality priority order of images displayed on said display screen based on at least ones of said obtained display state data and importance factors of the images preset by a user;

changing at least one display attribute including at least a resolution of each image and number of frames per unit time; and in accordance with said changed display attribute, processing said digital video data of each image to generate display video data.

3. A video data display processing system comprising:

video data input device;

at least one video data display device; and a signal transmission path interconnecting said video data input device and said video data display device, said video data input device including:
  video data sampler wherein input analog video data is sampled at a predetermined sampling timing and said sampled analog video data is converted into digital video data;
  a display attribute management table storing a display attribute of each image transferred from said video data display device;
  video data converter converting said digital video data in accordance with said display attribute stored in said display attribute table; and
  video data input controller coupled to said video data sampler and said video data converter, and said video data display device including:
  an image display;
  display driver coupled to said display;
  video data display controller controlling said display driver;
  a display state management table storing data representing at least the display state of each said image displayed on said display; and
  priority order determining means for determining as a display order a display quality priority order of said images in accordance with the data in said display state management table, wherein said video data display control unit controls said display driving means to receive from said video data input means said digital video data corresponding to a display request command and to display said received digital video data on said display, and operates to store the display state of each said image displayed on said display in said display state management table, to change the display attribute of each said image in accordance with the priority order determined by said priority order determining means, and to transfer said changed display attribute to said display attribute management table of said video data input unit.

4. A system according to claim 3, wherein said video data input device and said video data display device are interconnected via a communications network as said signal transmission path.

5. A system according to claim 3, wherein said video data input device and said video data display device are interconnected via a bus of a single computer system as said signal transmission path, and said digital video data is transferred to a video data storage connected to said bus.

6. A system according to claim 3, wherein said video data converter of said video data input device includes data compressor compressing said digital video data so as to match a limited transmission capacity of said signal transmission path, in accordance with said display attribute set to said display attribute management table.

7. A system according to claim 3, wherein said display attribute to be requested from said video data display device includes a spatial resolution and a time-domain resolution of each said image, said spatial resolution including the number of pixels per unit area of the screen of said display and said time-domain resolution including a frame rate.

* * * * *

UNITED STATES PATENT AND TRADEMARK OFFICE
CERTIFICATE OF CORRECTION

PATENT NO. : 5,621,429
DATED : 15 April 1997
INVENTOR(S) : Kimiya YAMAASHI et al.

It is certified that error appears in the above-indentified patent and that said Letters Patent is hereby corrected as shown below:

| Column | Line | |
|---|---|---|
| 6  | 27 | Change "(300, 300)" to --(300, 300)-- |
| 6  | 34 | Change "display" to --displayed--. |
| 8  | 35 | Change "8167" to --8167--. |
| 8  | 53 | After "frame number" insert --t--. |
| 13 | 14 | Change "Of" to --of--. |
| 13 | 36 | Change "(229," to --(229, 169).--. |
| 16 | 27 | After "includes" insert --a--. |

Signed and Sealed this

Eleventh Day of November, 1997

Attest:

BRUCE LEHMAN

Attesting Officer

Commissioner of Patents and Trademarks